United States Patent Office 3,009,381
Patented Nov. 21, 1961

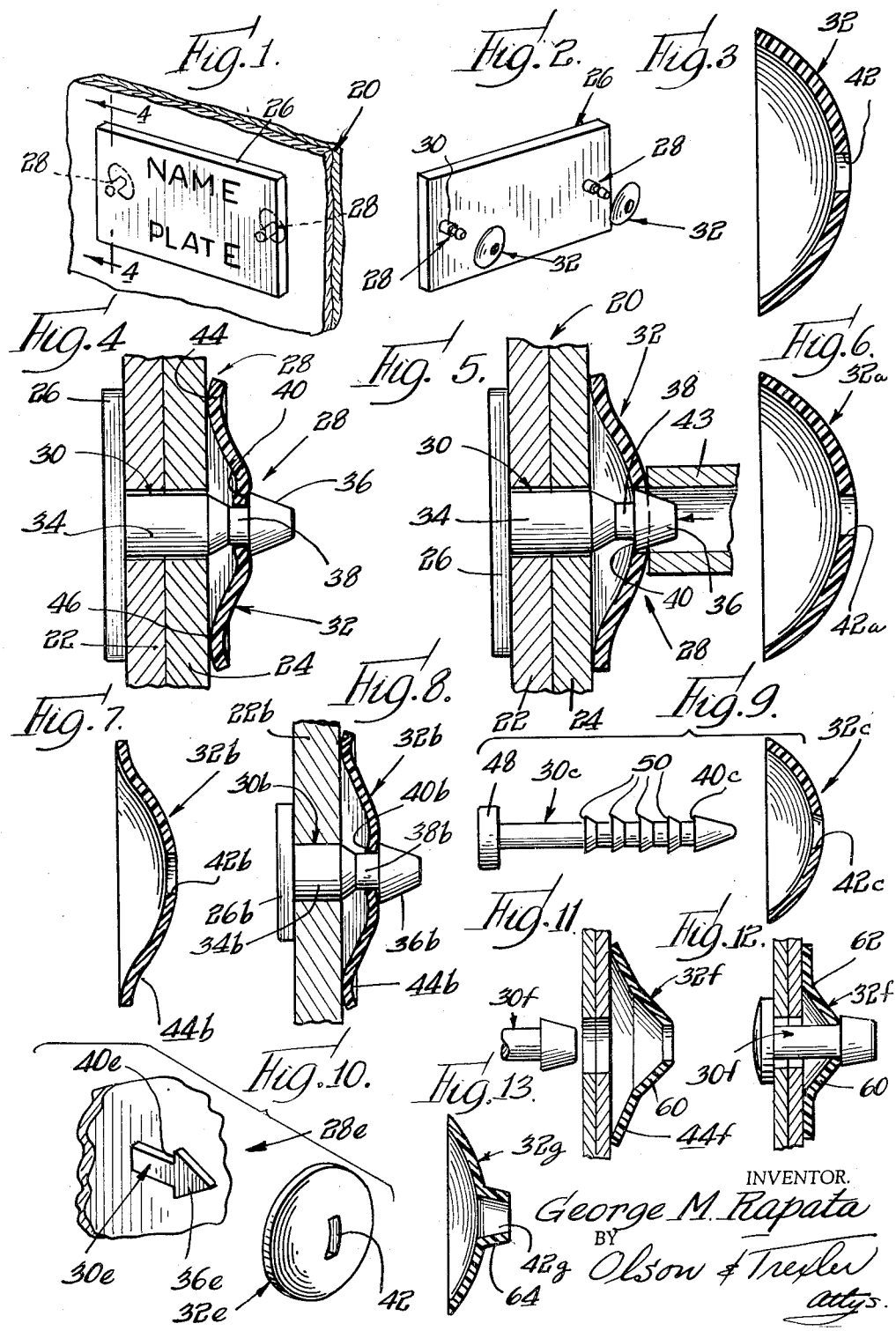

3,009,381
STUD AND DISHED PLASTIC FASTENING ELEMENT
George M. Rapata, Park Ridge, Ill., assignor to Illinois Tool Works, Chicago, Ill., a corporation of Illinois
Filed Nov. 27, 1957, Ser. No. 699,233
7 Claims. (Cl. 85—7)

The present invention relates to a novel fastening device, and more particularly to a novel fastening device utilizing a stud element and a cooperable member adapted to be applied thereto.

While various uses for the fastening device of the present invention may suggest themselves, the device is especially suitable for securing apertured workpieces together or for securing name plates and the like to an apertured workpiece. An object of the present invention is to provide a novel fastening device which is of simple and economical construction and which may be rapidly and easily applied to a workpiece.

A more specific object of the present invention is to provide a novel fastening device comprising elements which may be easily assembled together with simple relative axial movement. Still another object of the present invention is to provide a novel fastening device of the type mentioned above which is capable of substantially sealing an aperture through a workpiece when assembled with the workpiece.

Another object of the present invention is to provide a novel fastening device especially suitable for use with workpieces which may be subjected to salt water or sea air and which is constructed so as to minimize or eliminate electrolytic action between the parts.

A more specific object of the present invention is to provide a novel one-piece resilient plastic fastener member adapted to be easily and axially applied to a cooperable stud element for securely retaining the stud element and substantially sealing an aperture in a workpiece through which a stud element extends.

Other objects and advantages of the present invention will be apparent from the following description and the accompanying drawings wherein:

FIG. 1 is a perspective view showing an assembly incorporating the novel fastening device of the present invention;

FIG. 2 is an exploded perspective view showing elements of a novel fastening device incorporating features of the present invention;

FIG. 3 is an enlarged sectional view showing a plastic fastener member constructed in accordance with the present invention;

FIG. 4 is an enlarged sectional view taken along line 4—4 in FIG. 1;

FIG. 5 is a sectional view similar to FIG. 4 but shows the plastic fastener member in an intermediate stage of assembly with the stud member;

FIG. 6 is a sectional view of a plastic fastener member incorporating a modified form of the present invention;

FIG. 7 is a sectional view of a plastic fastener member incorporating another modified form of the present invention;

FIG. 8 is a sectional view showing the fastener member of FIG. 7 assembled with a stud element and a workpiece;

FIG. 9 is an exploded partial sectional view showing a fastening device incorporating another modified form of the present invention;

FIG. 10 is an exploded perspective view showing a further modified form of the present invention;

FIGS. 11 and 12 are sectional views of another modified form of the present invention and respectively show the fastening device in a position to be assembled with the workpiece and fully assembled with the workpiece; and FIG. 13 is a sectional view showing another embodiment of this invention.

Referring now more specifically to the drawings wherein like parts are designated by the same numerals throughout the various figures, an assembly 20 is shown in FIGS. 1, 4 and 5 which includes a pair of apertured workpieces or panels 22 and 24 and a name plate 26 secured to the apertured workpieces by a pair of fastening devices 28 constructed in accordance with the present invention. These fastening devices may also serve to retain the apertured workpieces together. In this embodiment, each of the fastening devices includes a stud element 30 which is butt welded or otherwise secured to the name plate 26, and a complementary fastening member 32.

Each stud member 30 has a first shank portion 34 with a diameter preferably similar to the diameter of the apertures through the workpieces 22 and 24 and an axial length similar to the combined thicknesses of the workpieces. An entering end portion 36 of each stud member is tapered or partially pointed, and a reduced diameter portion 38 is formed between the shank portion 34 and the entering end portion 36 so that the entering end portion provides radially projecting shoulder means 40 facing the workpieces and the trailing end of the stud member.

Each of the fastener members 32 is molded from a tough, resilient plastic material such, for example, as nylon. As shown in the drawings the member 32 is initially formed so that it is deeply dished or concavo-convex in shape. A central aperture 42 is provided in the member 32, which aperture has a diameter less than the maximum diameter of the entering end portion 36 of the stud member and more particularly less than the maximum diameter or transverse dimension of the shoulder means 40.

When assembling the parts described above, the stud members are first inserted through the workpiece apertures. Then the plastic fastener members 32 are axially pressed onto and forced over the entering end portions 36 of the stud members. An intermediate stage of assembly is shown in FIG. 5 which also shows how a simple hollow tool 43 may be used to press the member 32 over the stud. During initial application of the fastener member 32 to the stud, the tapered or pointed entering end portion of the stud easily enters the aperture 42. However, when the fastener member 32 has reached the intermediate stage of assembly shown in FIG. 5 the entering end portion of the stud 36 has caused the margin of the aperture 42 to be stretched or expanded. When the member 32 is fully assembled as shown in FIG. 4, the margin of the aperture 42 contracts toward its original diameter so that the member 32 engages the shoulder means 40 and is retained thereby. It is also to be noted that the shoulder means 40 is located on the stud member at a distance from the shank portion 34 and thus the workpiece 24 substantially less than the axial length or depth of the concavo-convex member 32. Thus, during assembly, the member 32 is axially compressed in the manner shown. At the same time the member 32 is slightly radially expanded and a peripheral portion 44 of the member is reversely curled or deflected in the manner shown so that a smooth, narrow, annular surface area 46 of the member 32 is tightly pressed against the workpiece 24 to provide a seal. In addition the inner marginal portion of the member 32 around the aperture 42 is deflected slightly axially inwardly or oppositely from the peripheral portion 44 and firmly presses against the annular shoulder means 40 for providing another seal. Thus it will be appreciated that the member 32 which is of extremely simple and economical construction may easily be applied to the stud member and will effectively serve to seal the apertures through the workpieces. It will also be appreciated that the member 32 cannot promote any electrolytic action since it is formed from a plastic material.

FIG. 6 shows a fastener member 32a which is similar to the corresponding member described above. This member differs in that the cross sectional thickness thereof tapers or is thinned toward its peripheral edge. Thus the resiliency or yieldability of the device progressively increases toward its peripheral edge. This enables the peripheral portion to be more easily radially expanded and reversely curled or deflected so as to facilitate application of the device to the stud member.

FIGS. 7 and 8 show another modified form of the present invention as indicated by the application of identical reference numerals with the suffix b added to corresponding elements. In this embodiment the plastic member 32b is molded so that it has initially the shape shown in FIG. 7 with the peripheral portion 44b, reversely curled or deflected. This shape further facilitates radial expansion and reverse curling of the peripheral portion during application of the plastic member to the stud.

FIG. 9 shows another embodiment of the fastening device of the present invention which is similar to the structures described above as indicated by the application of identical reference numerals with the suffix c added to corresponding elements. In this embodiment the stud member 30c is separate from an article such as a name plate which is to be secured and is provided with a head portion 48 adapted to retain such an article. In addition the stud member is provided with a greatly elonagted shank having axially spaced radially projecting shoulder means 50 similar to the shoulder means 40c at the entering end of the stud shank. This enables the device to be applied to various work structures having different thicknesses. In this embodiment the aperture 42c in the member 32c is tapered toward the convex side of the member so as to facilitate application of the member to the stud and expansion of the aperture during such application.

FIG. 10 shows a fastening device 28e which is similar to the above described structures as indicated by the application of identical reference numerals with the suffix e added to corresponding parts. In this embodiment the stud member 30e which is flat illustrates how the stud member may be provided with a cross sectional shape other than circular. The opening 42e in the plastic member 32e is provided with a shape corresponding to the cross section of the stud member or, in other words, the opening 42e is in the form of a slot having a length less than the over-all transverse dimension of the shoulder means 40e and a width similar to the thickness of the stud member. It will be appreciated that the plastic members of any of the embodiments described above may be provided with a non-circular or slot-like opening for use with a correspondingly non-circular stud member.

FIGS. 11 and 12 show another embodiment of the present invention similar to those described above as indicated by the application of identical reference numerals with the suffix f added to corresponding elements. In this embodiment the dished plastic member 32 is formed so that it is provided with a first frusto-conical portion 60 and a second frusto-conical peripheral portion 44f which is a new angle substantially greater than the new angle of the portion 60. When the device 32f is assembled with the complementary stud as shown in FIG. 12, the peripheral portion is deflected reversely at the annular junction 62 with the frusto-conical portion 60 so that the peripheral portion 44f is urged in a flat condition against the work structure. In addition, the peripheral portion 44f is radially expanded. With this structure, the frusto-conical portion 60 provides a substantially rigid strut action which prevents a complete collapse of the member 32 and the inherent tendency for the portion 44f to contract radially and also to return to its frusto-conical condition provides a double spring action which maintains the member 32 in firm engagement with the stud.

The device 32g shown in FIG. 13 is similar to the embodiment shown in FIGS. 1-5 except that it is provided with a small frusto-conical projection 64 which defines the central aperture 42g. In this embodiment the projection 64 serves to prevent undue deflection or expansion of the central aperture so as substantially to eliminate any possibility of unauthorized withdrawal of the stud.

While the preferred embodiments of the present invention have been shown and described herein it is obvious that many structural details may be changed without departing from the spirit and scope of the appended claims.

This invention is claimed as follows:

1. A fastener assembly comprising a stud member having a shank insertible through a work structure aperture and including radially projecting shoulder means adjacent the entering end thereof, and a resilient plastic fastener member in dished substantially concavo-convex form having a relatively thin cross section which is substantially less than the axial extent of the fastener member and the axial extent of the fastener member being less than the diameter thereof but greater than the distance from the work structure to the shoulder means, said fastener member having the concave side thereof facing the work structure and having a central aperture, the normal largest dimension of said aperture being less than the largest dimension of said shoulder means and stretched over the entering end of the stud member to a position with the portion of the fastener member surrounding said aperture trapped behind the shoulder means thereon but spaced from the work structure in assembled position wherein the outer periphery of the fastener member is forced outwardly along the work structure to bring an inner portion of the fastener member into sealing engagement with the work structure with maintenance of the axial spacing of the apertured central portion from the work structure and resultant stressed condition of the resilient fastener member.

2. A fastener assembly as claimed in claim 1, wherein the shank is provided with a tapered entering end and wherein the fastener member includes a conical section around the central aperture facilitating the passage therethrough of the tapered end on the stud member.

3. A fastener assembly as claimed in claim 1, wherein the fastener member is substantially a segment of a sphere.

4. A fastener assembly as claimed in claim 1, wherein the outer periphery of the dished fastener member is reversely deflected in bringing the inner portion of the periphery into sealing engagement with the work structure.

5. A fastener assembly as claimed in claim 4, wherein the cross section of the fastener member is of progressively diminishing thickness toward the outer periphery thereof facilitating the reverse deflection of the outer periphery.

6. A fastener assembly as claimed in claim 1, wherein the stud member is flattened and wherein the central aperture in the fastener member comprises an elongated slot through which the flattened end of the stud member is passed.

7. A fastener assembly as claimed in claim 1, wherein the concavo-convex dished form of the fastener member comprises a first frusto-conical portion through which the central aperture is disposed, and a second frusto-conical portion extending outwardly from the first frusto-conical portion and adapted for engagement with the work structure.

(References on following page)

References Cited in the file of this patent
UNITED STATES PATENTS

| | | |
|---|---|---|
| 643,045 | Denis | Feb. 6, 1900 |
| 826,104 | Honiss | July 17, 1906 |
| 1,890,348 | Weatherhead | Dec. 6, 1932 |
| 2,097,713 | Ashley | Nov. 2, 1937 |
| 2,358,206 | Boersma | Sept. 12, 1944 |
| 2,367,657 | Boersma | Jan. 23, 1945 |
| 2,374,796 | Amberg | May 1, 1945 |
| 2,456,355 | Aber | Dec. 14, 1948 |
| 2,729,080 | Bennett | Jan. 3, 1956 |
| 2,824,464 | Remington | Feb. 25, 1958 |

FOREIGN PATENTS

| | | |
|---|---|---|
| 760,978 | Great Britain | Nov. 7, 1956 |